United States Patent Office 3,261,785
Patented July 19, 1966

3,261,785
MODIFIED VINYL CHLORIDE POLYMERS
Anderson E. Robinson, Wilmington, Del., assignor to Hercules Incorporated, a corporation of Delaware
No Drawing. Filed June 25, 1963, Ser. No. 290,317
10 Claims. (Cl. 260—2.5)

This application is a continuation-in-part of copending application Serial Number 230,677, filed Oct. 15, 1962, now abandoned.

This invention relates to modifying polymers and to the products so produced. More particularly, the invention relates to modifying vinyl chloride polymers with aliphatic polysulfonazides and to the products so produced.

In the past, polyvinyl chloride has been cross-linked, i.e., vulcanized, with various cross-linking agents such as, for example, a combination of a peroxide and bis-(maleimide). However, the resulting products were all deficient in certain respects such as viscous flow (creep), solubility, fusibility, etc.

Now in accordance with this invention it has unexpectedly been found that vinyl chloride polymers can be cross-linked by heating in the presence of an aliphatic polysulfonazide having the formula $$R(SO_2N_3)_x$$

where $x$ is an integer greater than 1 and R is an organic radical selected from the group consisting of aliphatic and aryl aliphatic radicals, said sulfonazide groups being attached to aliphatic carbon atoms, to give a thermoset product which is tough, resilient, solvent-resistant and free from viscous flow and odor. In addition, the instant invention permits the use of lower molecular weight, easier processing vinyl chloride polymers than would otherwise be operable. Another advantage of this invention is its adaptability to the preparation of foamed vinyl chloride polymers. Still another advantage is that the vinyl chloride polymer can be treated with smaller amounts of the sulfonazide to improve its properties without materially affecting its solubility.

Any aliphatic polysulfonazide as defined above can be used in the process of this invention. Most preferably, and for most applications, $x$ will be an integer from 2 to 100 and R will be an alkyl or chloroalkyl radical containing from about 4 to about 40 carbon atoms; however, these radicals can also contain ether, sulfide, ester, etc., groups which are inert to the modification reaction. Exemplary aliphatic polysulfonazides are 1,7-heptane bis(sulfonazide), 1,10-decane bis(sulfonazide), the polysulfonazides produced from a chloro- and sulfochlorinated mixture of petroleum hydrocarbons containing at least 0.1% chlorine, 7-oxatridecane-1,13-bis(sulfonized), 6-thiaundecane 1,11-bis(sulfonazide), poly(ethylene sulfonazide), the copolymer poly(sodium ethylene sulfonate-ethylene sulfonazide), etc.

Any vinyl chloride polymer, homopolymer or copolymer containing at least about 20 mole percent of vinyl chloride can be modified in accordance with this invention. Exemplary of these polymers are polyvinyl chloride, vinyl chloride-vinyl acetate copolymers, vinyl chloride-vinylidene chloride copolymers, vinyl chloride-acrylonitrile copolymers, vinyl chloride-1,2-ethylene dicarboxylic acid alkyl ester copolymers such as vinyl chloride-diethyl fumarate copolymers, vinyl chloride-diethyl maleate copolymers, etc. The polymers to be modified can be either a plastisol grade or a plastic grade, since modification by the process of this invention is equally adaptable to either type. Those polymers containing at least 60 mole percent vinyl chloride are most preferred.

The modification process of this invention can be carried out by heating the vinyl chloride polymer in the presence of the polysulfonazide to a temperature at which the sulfonazide decomposes. This temperature varies over a wide range but in general will be from about 120° C. to about 250° C., most preferably from about 150° C. to about 230° C. Various amounts of the sulfonazide can be added, the optimum amount depending on the amount of cross-linking or other modification desired, the specific polysulfonazide employed, etc. In general, the amount added, based on the weight of the vinyl chloride polymer, will be from about 0.01% to about 20%.

The aliphatic polysulfonazide can be incorporated with the vinyl chloride polymer in any desired fashion. For example, it can be uniformly blended by simply milling on a conventional rubber mill, by extrusion mixing or dissolved in a solution containing the polymer. By any of these means, the aliphatic polysulfonazide is distributed throughout the polymer and uniform cross-linking or other modification is effected when the blend is subjected to heat. Other methods of mixing the sulfonazide with the polymer will be apparent to those skilled in the art.

In addition to the aliphatic polysulfonazide, other ingredients can also be incorporated, as, for example, extenders, fillers, pigments, plasticizers, processing aids, stabilizers, blowers (discussed below), etc. Obviously, there are many cases in which other additives are not required or desired and excellent results are achieved when only the polysulfonazide is added.

The process of this invention is particularly advantageous in the preparaation of cross-linked polyvinyl chloride foams. Using this process, it is possible to produce either rigid or flexible foams of any desired density having uniform closed cell structures or open cell structures.

Any of the well-known chemical blowing agents can be used in the preparation of the foams. Exemplary blowing agents are azodicarbonamide, N,N'-dinitrosopentamethylene tetramine, N,N'-dimethyl-N,N'-dinitrosoterephthalamide, p,p'-oxy-bis(benzene sulfonyl semicarbazide), p,p'-oxy-bis(benzene sulfonyl hydrazide), p,p'-diphenyl-bis(sulfonyl hydrazide), benzene-sulfonyl hydrazide, n-benzene-bis(sulfonyl hydrazide), etc. The well-known solvent blowing agents such as butane, hexane, chloroform, trichloroethylene, etc., can also be used in the preparation of these foams. Low boiling polyhalogenated compounds such as monochlorotrifluoromethane, monochlorodifluoromethane, dichlorotetrafluoroethylene, etc., are particularly useful in preparing foams exhibiting superior insulating properties. Accordingly, any compound which decomposes or volatilizes to yield at least one mole of gas per mole of blowing agent at a temperature of 190° C. or less can be used.

Various types of foams can be prepared from the vinyl chloride polymers described above depending upon the specific one used. For example, polyvinyl chloride yields rigid and semi-rigid foams. Flexible foams are obtained from polyvinyl chloride plastisols and the vinyl chloride copolymers.

In preparing foams in accordance with this invention, the vinyl chloride polymer is first blended with a polysulfonazide and a blowing agent. Any desired means can be made for bring about this blending. When a solvent blowing agent is used, a convenient method for forming the desired expandable blend is to mix the vinyl chloride polymer and polysulfonazide, pass the mixture through an extruder to form pellets which then are soaked in the solvent blowing agent until the desired amount of the latter has been absorbed. When a chemical blowing agent is used, the polysulfonazide and blowing agent can be mixed with a diluent (which can also contain a stabilizer or other modifier for the vinyl chloride polymer) and then the polymer in finely divided form can be added and mixed into a slurry. On evaporation of the diluent, an intimate mixture of the polymer, blowing agent, and polysulfonazide is obtained. When a polyvinyl chloride plastisol is used, the polysulfonazide and blowing agent can readily be mixed into the dispersion.

The cross-linking and blowing of the above-described expandable blends is then carried out by heating the blend to a temperature from about 120° C. to about 250° C. The period of time required to effect the desired degree of blowing will depend on the temperature used, etc., but will usually be about 1–10 minutes. The exact temperature to be used will then depend on the polysulfonazide and blowing agents used, the length of time the blend is heated, etc. The cross-linking and blowing usually takes place simultaneously but may take place sequentially depending on the type of foaming process used. Thus, if the expandable composition is heated in a mold or open vessel without the application of pressure, cross-linking and blowing will take place essentially simultaneously. On the other hand, if the expandable composition is heated in an extruder with a temperature gradient (as in wire coating), blowing may be at least partially effected at the lower temperature in the forepart of the extruder and cross-linking at the higher temperature at the end of the extruder, in which case cross-linking is partially effected immediately prior to the expansion that takes place when the mass leaves the extruder. Regardless of the specific process, cross-linking must occur before the foam collapses but must not be complete before expansion. Obviously, best results can be obtained when using a blowing agent-polysulfonazide pair which decompose (or volatilize in the case of the solvent blower) at about the same temperature.

The amount of aliphatic polysulfonazide used in the preparation of the foams must be at least sufficient to prevent collapse of the expanded composition. Generally the amount will be from about 0.1% to about 10.0% by weight of the polymer, although higher concentrations can be used if desired. The amount of blowing agent incorporated will obviously depend on the degree of blowing desired; that is, the density desired for the final foamed product and the type of blowing agent used. In general, when using a chemical blowing agent, the amount will be within the range of from about 0.5% to about 20% by weight of the polymer. When using a solvent blowing agent, the amount will be within the range of from about 5% to about 30% by weight of the polymer.

The following examples are presented for purposes of illustration, parts and percentages being by weight unless otherwise specified. The extent of cross-linking is indicated by the resulting vulcanizates' insolubility in (expressed as percent gel) and swelling by (expressed as percent swell) chlorobenzene which is a complete solvent for the polymers and the uncross-linked compounds. Insolubility results upon the integration of individual polymer molecules into a three dimensional cross-linked macromolecule. Solvents which readily dissolved the polymer prior to vulcanization thereafter merely swelled the vulcanizate without appreciably altering its contours. The degree of swelling is proportional to the molecular weight of the polymer molecule segments between adjacent cross-links, i.e., inversely proportional to the cross-link density or state of cure. A 100% gel indicates a hypothetical minimal cure state in which each original polymer molecule is joined to one other molecule by one cross-link. The swelling of such a vulcanizate by a solvent would be very high, corresponding to a swell value of several thousand percent. Consistent with the high statistical improbability of occurrence of such a prefectly ordered distribution of cross-links, it is observed in practice that the swell value decreases continuously as the gel value increases, indicating that cross-links are established randomly. Thus, it is found in practice that the first isolatable minimally cured 100% insoluble vulcanizate contains more than one cross-link per original polymer molecule, the actual number being around 10, corresponding to swell values of the order of 1000%. Higher cross-link densities, i.e., lower swell values than about 100%, indicate a proportional degree of overcure.

In all of the examples, percent gel and swell are determined as follows: A one-half inch diameter by 0.050 inch thick disc-shaped specimen was weighed and macerated in 60 cc. of chlorobenzene for 4 hours at 80° C. The swollen sample was then blotted free of excess chlorobenzene and promptly weighed in the swollen condition. The specimen was then dried in vacuum for 4 hours at 80° C. and reweighed. The initial, swollen and dry weights were each corrected (for nonpolymer components of the specimen) to a 100% polymer base. From these figures, percent gel is calculated by the formula $$\frac{\text{corrected dry weight}}{\text{corrected initial weight}} \times 100 = \text{percent gel}$$

Similarly, percent swell is calculated by the formula $$\frac{\text{corrected swollen weight} - \text{corrected dry weight}}{\text{corrected dry weight}} \times 100 = \text{percent swell}$$

*Example 1*

An aliphatic bis-sulfonazide was prepared as follows: 1,10-decanedithiol dissolved in a mixture of glacial acetic acid and water was treated with chlorine gas. The resulting 1,10-decane disulfonyl chloride was then reacted with sodium azide to give a good yield of high purity 1,10-decane bis(sulfonazide). The resulting 1,10-decane bis(sulfonazide) had a solubility in n-heptane at a temperature of 95° C. of 1.7%. To 100 parts of a vinyl chloride-vinyl acetate copolymer containing 85% by weight of vinyl chloride and having a specific gravity of 1.36 at 25° C. and a specific viscosity of 0.56 as determined at 20° C. on a 1% solution in methylisobutyl ketone was added 10 parts of the 1,10-decane bis(sulfonazide). This mixture was blended on a two-roll mill at a temperature of 95° C. for 5 minutes. Specimens 1 x 4 x 0.050 inch were cured between steel plates under a pressure of 1500 p.s.i. at a temperature of 155° C. for 45 minutes. The resulting tough vulcanizate was insoluble in chlorobenzene. A sample of the vinyl chloride-vinyl acetate copolymer treated in the exact same way except for the addition of the bis(sulfonazide) was completely soluble in chlorobenzene. A sample of the vulcanizate was tested for percent gel and swell and found to have a percent gel of 96 and a percent swell of 245.

*Examples 2 and 3*

Two samples of a polyvinyl chloride having a specific gravity of 1.40 at 25° C. and a specific viscosity of 0.60 as determined at 20° C. on a 1% solution in methyl-isobutyl ketone were cross-linked with different amounts of the 1,10-decane bis(sulfonazide) described in Example 1. Each sample (in the form of finely divided powder) was slurried in sufficient toluene to form an easy-mixing paste. To each slurry was added an amount of 1,10-decane bis(sulfonazide) and with continuous stirring the toluene was allowed to evaporate over a 72 hour period. The resulting dry powder was compression molded for 1 hour at a temperature of 160° C. into 1 x 2 x 0.05 inch specimens. A control sample was treated in exactly the same way except for the addition of 1,10-decane bis(sulfonazide). The amount of sulfonazide added to each sample (expressed as parts per hundred of polymer) and the percent gel and swell of the resulting products are tabulated below:

| Example | Sulfonazide Cross-linker, p.p.h. | Gel, percent | Swell, percent |
| --- | --- | --- | --- |
| 2 | 10 | 101 | 205 |
| 3 | 5 | 99 | 315 |
| Control | 0 | 0 | ∞ |

Examples 4–9

Six samples of the polyvinyl chloride described in Examples 2 and 3 were compounded on a two roll mill at a temperature of 135° C. with different processing aids, a stabilizer and the 1,10-decane bis(sulfonazide) described in Example 1. The amounts of the ingredients (by parts) in each formulation are tabulated below:

| Example | Polyvinyl chloride | Dibasic lead phthalate a | Liquid Polyester b | Dioctyldecyl phthalate c | Chlorinated low density Polyethylene c | 1,10-Decane bis (sulfonazide) |
|---|---|---|---|---|---|---|
| Control (1) | 10 | 1 | 0 | 0 | 0 | 0 |
| Control (2) | 10 | 1 | 0.5 | 0 | 0 | 0 |
| 4 | 10 | 1 | 0.5 | 0 | 0 | 0.5 |
| 5 | 10 | 1 | 0.5 | 0 | 0 | 1.0 |
| Control (3) | 10 | 1 | 0 | 0.5 | 0 | 0 |
| 6 | 10 | 1 | 0 | 0.5 | 0 | 0.5 |
| 7 | 10 | 1 | 0 | 0.5 | 0 | 1.0 |
| Control (4) | 10 | 1 | 0 | 0 | 0.5 | 0 |
| 8 | 10 | 1 | 0 | 0 | 0.5 | 0.5 |
| 9 | 10 | 1 | 0 | 0 | 0.5 | 1.0 | a Stabilizer.
b Processing aid prepared from adipic acid and ethylene glycol.
c Processing aid.

Each of the samples and controls was compression molded as described in Examples 2 and 3. The products cross-linked with disulfonazide were very lightly colored, flexible, smooth and glossy. The percent gel and swell of each sample and control was determined and is tabulated below:

| Example | Gel, percent | Swell, percent |
|---|---|---|
| Control (1) | 0 | ∞ |
| Control (2) | 0 | ∞ |
| 4 | 75 | 2,995 |
| 5 | 104 | 135 |
| Control (3) | 0 | ∞ |
| 6 | 102 | 1,340 |
| 7 | 104 | 105 |
| Control (4) | 0 | ∞ |
| 8 | 69 | 1,920 |
| 9 | 104 | 90 |

Examples 10 and 11

Two samples of the polyvinyl chloride described in Examples 2 and 3 were compounded on a two roll mill at a temperature of 135° C. with a processing aid, a stabilizer and a polysulfonazide produced from a chloro- and sulfo-chlorinated mixture of petroleum hydrocarbons (boiling range 173–200° C., having an average of 11 to 12 carbon atoms). The amounts of the ingredients (by parts) in each formulation are tabulated below:

| Example | Polyvinyl chloride | Dibasic lead phthalate | Liquid polyester | Polysulfonazide |
|---|---|---|---|---|
| 10 | 10 | 1 | 0.5 | 0.5 |
| 11 | 10 | 1 | 0.5 | 1.0 |
| Control | 10 | 1 | 0.5 | 0 |

Both samples and the control were compression molded as described in Examples 2 and 3. The percent gel and swell of both samples and the control were determined and are tabulated below:

| Example | Gel, percent | Swell, percent |
|---|---|---|
| 10 | 74 | 2,160 |
| 11 | 105 | 205 |
| Control | 0 | ∞ |

Example 12

A polyvinyl chloride plastisol was prepared by blending equal parts by weight of the finely divided polyvinyl chloride described in Examples 2 and 3 with the liquid polyester described in Examples 4 and 5. To the plastisol dispersion was added with stirring 5 parts per hundred of dibasic lead phthalate stabilizer and 5 parts per hundred of the 1,10-decane bis(sulfonazide) described in Example 1. The resulting creamy mixture was poured into a 1 x 2 x 0.05 inch mold and compression molded for 1 hour at a temperature of 160° C. The rubbery product had a percent gel of 112 and a percent swell of 425.

Examples 13–17

These examples show the preparation of flexible foams from polyvinyl chloride plastisols, blowing agents and the 1,10-decane bis(sulfonazide) described in Example 1. The amounts of the ingredients (by parts) in each formulation are tabulated below:

| Examples | 13 | 14 | 15 | 16 | 17 | Control |
|---|---|---|---|---|---|---|
| Polyvinyl chloride a | 10 | 10 | 10 | 10 | 10 | 10 |
| Dibasic lead phthalate | 1 | 1 | 1 | 1 | 1 | 1 |
| Liquid polyester b | 7 | 7 | 10 | 10 | 7 | 7 |
| Epoxidized soya oil | 3 | 3 | 0 | 0 | 3 | 3 |
| Azodicarbonamide | 1.5 | 0.5 | 0 | 0 | 3 | 0 |
| p,p'-oxybis (benzene sulfonyl hydrazide) | 0 | 0 | 1.5 | 0 | 0.5 | 0 |
| N,N'-dinitrosopentamethylene tetramine | 0 | 0 | 0 | 1.5 | 0 | 0 |
| 1,10-decane bis(sulfonazide) | 1.0 | 1.0 | 1.0 | 1.0 | 0.25 | 0 | a The finely divided polymer described in Examples 2 and 3.
b Described in Examples 4 and 5.

Each formulation was poured into an open beaker and heated for 30 minutes at a temperature of 171° C. The resulting cross-linked flexible foams were of uniform closed-cell structure. The control after the above treatment was a soft, tan colored solid. The foams and the control were tested to determine their density in pounds per cubic foot, volume expansion $$\frac{\text{final volume}}{\text{initial volume}} \times 100$$

and percent gel. The results are tabulated below:

| | 13 | 14 | 15 | 16 | 17 | Control |
|---|---|---|---|---|---|---|
| Density | 13 | 49 | 33 | 18 | 10 | 91 |
| Volume expansion, percent | 750 | 200 | 260 | 520 | 840 | 0 |
| Gel, percent | 178 | 186 | 130 | 118 | 25 | 0 |

What I claim and desire to protect by Letters Patent is:

1. A process of modifying a vinyl chloride polymer selected from the group consisting of polyvinyl chloride, vinyl chloride-acrylonitrile copolymers, vinyl chloride-vinyl acetate copolymers, vinyl chloride-vinylidene chloride copolymers, and vinyl chloride-1,2-ethylene dicarboxylic acid alkyl ester copolymers which comprises heating said polymer in the presence of an aliphatic polysulfonazide having the general formula $$R(SO_2N_3)_x$$

where $x$ is an integer greater than 1 and R is an organic radical selected from the group consisting of aliphatic and aryl aliphatic radicals, said sulfonazide groups being attached to aliphatic carbon atoms.

2. The process of claim 1 wherein the aliphatic polysulfonazide is 1,10-decane bis(sulfonazide).

3. The process of claim 1 wherein the vinyl chloride polymer is polyvinyl chloride.

4. The process of claim 1 wherein the vinyl chloride polymer is a vinyl chloride-vinyl acetate copolymer.

5. The process of claim 1 wherein the vinyl chloride polymer is cross-linked by said modifying process.

6. A vinyl chloride polymer selected from the group consisting of polyvinyl chloride, vinyl chloride-acrylonitrile copolymers, vinyl chloride-vinyl acetate copolymers, vinyl chloride-vinylidene chloride copolymers and vinyl chloride-1,2-ethylene dicarboxylic acid alkyl ester copolymers modified with an aliphatic polysulfonazide having the general formula $$R(SO_2N_3)_x$$

where $x$ is an integer greater than 1 and R is an organic radical selected from the group consisting of aliphatic and aryl aliphatic radicals, said sulfonazide groups being attached to aliphatic carbon atoms.

7. The product of claim 6 wherein the aliphatic polysulfonazide is 1,10-decane bis(sulfonazide).

8. The product of claim 6 wherein the vinyl chloride polymer is polyvinyl chloride.

9. The product of claim 6 wherein the vinyl chloride polymer is a vinyl chloride-vinyl acetate copolymer.

10. An expandable cross-linkable vinyl chloride polymer composition comprising a blend of (1) a vinyl chloride polymer selected from the group consisting of polyvinyl chloride, vinyl chloride-acrylonitrile copolymers, vinyl chloride-vinyl acetate copolymers, vinyl chloride-vinylidene chloride copolymers and vinyl chloride-1,2-ethylene dicarboxylic acid alkyl ester copolymers;

(2) a blowing agent and (3) an aliphatic polysulfonazide having the general formula $$R(SO_2N_3)_x$$

where $x$ is an integer greater than 1 and R is an organic radical selected from the group consisting of aliphatic and aryl aliphatic radicals, said sulfonazide groups being attached to aliphatic carbon atoms.

References Cited by the Examiner

UNITED STATES PATENTS

| | | | |
|---|---|---|---|
| 2,518,249 | 9/1950 | Ott | 260—2.5 |
| 2,532,243 | 11/1950 | Ott | 260—2.5 |
| 2,668,152 | 2/1954 | O'Neal | 260—2.5 |
| 2,678,293 | 5/1954 | McMillan et al. | 260—2.5 |
| 2,825,282 | 3/1958 | Gergen et al. | 260—2.5 |
| 2,830,029 | 4/1958 | Adams | 260—2.5 |
| 3,058,944 | 10/1962 | Breslow et al. | 260—2.5 |
| 3,137,745 | 6/1964 | Johnstone | 260—2.5 |

MURRAY TILLMAN, *Primary Examiner.*

M. FOELAK, *Assistant Examiner.*